UNITED STATES PATENT OFFICE.

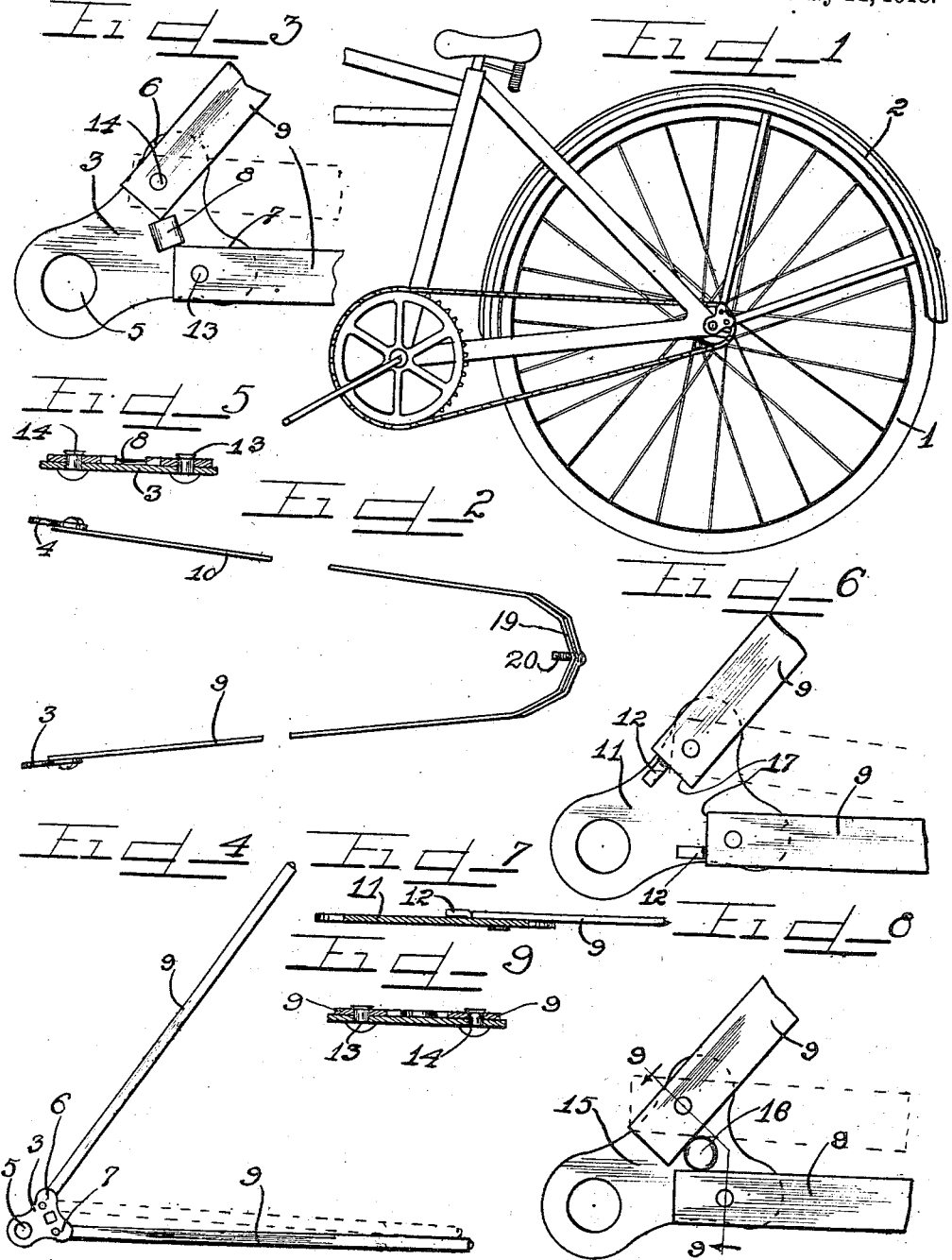

WALTER R. GREEN, OF CHICAGO, ILLINOIS.

ATTACHING BRACE AND SUPPORT FOR MUD-GUARDS.

1,266,251.

Specification of Letters Patent.

Patented May 14, 1918.

Application filed August 13, 1917. Serial No. 185,928.

*To all whom it may concern:*

Be it known that I, WALTER R. GREEN, a citizen of the United States, and a resident of the city of Chicago, in the county of Cook and State of Illinois, have invented certain new and useful Improvements in Attaching Braces and Supports for Mud-Guards; and I do hereby declare that the following is a full, clear, and exact description of the same, reference being had to the accompanying drawings, and to the numerals of reference marked thereon, which form a part of this specification.

This invention relates to improvements in an attaching brace and support for mud guards.

It is an object of this invention to provide a brace and support adapted to be collapsed for shipment to occupy small space, and in which a plurality of pivoted braces are provided adapted to be spread apart when applied to the mud guard and secured thereto.

It is a further object of this invention to provide a simple brace and support which may be readily secured to any mud guard.

It is further an object of this invention to provide a device of the class specified in which means are provided for limiting the diverging of the braces to thereby form a rigid brace and in which the arms may be slightly sprung if desired by jamming the ends thereof into the same means.

Other and further important objects of this invention will be apparent from the disclosures in the specification and drawings.

The invention (in a preferred form) is illustrated in the drawings and hereinafter more fully described.

On the drawings:

Figure 1 is a fragmentary view of a bicycle provided with a mud guard support and brace embodying my invention.

Fig. 2 is an edge perspective view thereof.

Fig. 3 is an enlarged detail showing the braces spread.

Fig. 4 is a view showing the braces spread in full lines and collapsed in dotted lines.

Fig. 5 is a section taken through the attaching plate at the pivot points for the braces.

Fig. 6 is a view of a modified form of attaching plate.

Fig. 7 is a sectional view thereof.

Fig. 8 is a view of a modified form of device.

Fig. 9 is a section taken on line 9—9 of Fig. 8.

As shown on the drawings:

1, indicates the rear wheel of a bicycle, and 2, a mud guard attached thereto by means of a support and brace embodying this invention. The brace comprises a pair of plates or members 3—4, each of which is provided with an aperture 5, to receive the ends of the wheel shaft or bolt therethrough. Said attaching member or plate is provided with diverging arms 6—7, between which is struck a lug or stop 8, having opposite sides parallel, as shown in Fig. 3.

Each brace comprises a continuous strap of metal providing outwardly diverging arms 9—10, connected by an arched part 19, in which is provided a screw aperture to receive the attaching screw 20. Opposite ends of each brace are pivoted to the corresponding arm 6 or 7, of the attaching member by means of rivets 13—14.

In the construction shown in Figs. 6 and 7, the attaching plates 11 are provided with struck up lugs or detents 12, one for each arm 9, against which the bottom 17, of the brace arms is adapted to engage.

In the construction shown in Figs. 8 and 9, a detent or stop member 16, is provided in the attaching plate 15, against which the sides of the brace arms 9—9, engage to limit the spreading of the brace members.

The operation is as follows:

In the construction shown in Figs. 1 to 5, braces are pivoted to the attaching plates, one on each side of the stop or lug 8, and when shipping, may be folded together, as shown in Fig. 4, in dotted lines. When attaching to the mud guard, the arms are swung oppositely until the inner ends thereof engage the parallel faces of the stop 8, in which position the brace arms are firmly held. However, if desired to slightly spring the same further, this may be accomplished by exerting sufficient force to partially wear off the thin sharp edge of the brace arms so that slight inaccuracies in drilling the holes in the mud guards for the attaching screws 20, may be compensated for.

In the constructions shown in Figs. 6 to 9, the brace arms engage the stops either at the sides or bottom, and have a broad bearing surface instead of a bearing point. In all the constructions, the arms may be folded together to form a compact bundle.

The constructions disclosed provide a very efficient mud guard brace and support which is adapted to be folded to small compass in shipping, and which may be readily unfolded, and in which the arms are positioned in approximate position for attaching to the mud guard.

Details of construction may be varied and numerous changes made without departing from the principles of this invention, and I therefore do not desire to limit the patent when granted, otherwise than necessitated by the prior art.

I claim as my invention:

1. In a mud guard brace and support, attaching members, a plurality of U-shaped braces pivoted thereto at opposite ends and a stop on each member between the ends of the U-shaped braces.

2. In a device of the class described, apertured attaching plates, a stop struck therefrom, and brace arms pivoted to the attaching plates, one on each side of the stop.

3. In a device of the class described, oppositely disposed attaching members, braces pivoted thereto, each comprising diverging arms connected by an arched portion, and a stop member between the pivoted arms.

4. In a device of the class described, attaching plates, braces pivoted thereto adapted to fold together, and means limiting the spreading of said braces.

5. In a device of the class described, attaching members, arms pivoted thereto, and a plurality of means secured to each attaching member to limit the spread of the arms.

In testimony whereof I have hereunto subscribed my name in the presence of two subscribing witnesses.

WALTER R. GREEN.

Witnesses:
CHARLES W. HILLS, Jr.
EARL M. HARDINE.

Copies of this patent may be obtained for five cents each, by addressing the "Commissioner of Patents, Washington, D. C."